United States Patent [19]

Jackson

[11] 4,307,601
[45] Dec. 29, 1981

[54] APPARATUS FOR CALIBRATING FLOW METERS AND THE LIKE

[75] Inventor: George R. Jackson, Doylestown, Pa.

[73] Assignee: Arcstart, Inc., Feasterville, Pa.

[21] Appl. No.: 93,155

[22] Filed: Nov. 13, 1979

[51] Int. Cl.$^3$ .......................... G01F 3/02; G01F 25/00
[52] U.S. Cl. ..,........................................ 73/3; 73/234; 73/861
[58] Field of Search ................ 73/3, 861, 861.01, 196, 73/232, 234, 242, 252; 364/510, 571

[56] References Cited

U.S. PATENT DOCUMENTS

| | | | |
|---|---|---|---|
| 3,125,879 | 3/1964 | Porter | 73/3 |
| 3,457,768 | 7/1969 | Jasek | 73/3 |
| 3,933,027 | 1/1976 | Mehall | 73/3 |
| 3,937,048 | 2/1976 | St. Clair et al. | 73/3 |
| 4,253,156 | 2/1981 | Lisle et al. | 364/510 X |

*Primary Examiner*—James J. Gill
*Attorney, Agent, or Firm*—Weinstein & Sutton

[57] ABSTRACT

Measuring apparatus for calibrating flow meters and the like comprising a piston slidably mounted within piston cylinder means which receives gas passing through the flow meter being calibrated to cause the piston to be lifted. A precision encoder is rotated responsive to the movement of tape means aligned with the central axis of the piston and entrained about a pulley driving said encoder means. The tape is also connected to counterbalancing weight means for enhancing the sensitivity and accuracy of the measuring apparatus. The system electronics initiate operation of timer means upon the first pulse generated by the encoder means after operation of a start button and terminates the operation of the timer means upon the first encoder pulse generated after operation of stop button.

Temperature and pressure in the piston cylinder are constantly monitored. These readings are employed at the time flow rate calculations are performed to correct the flow rate calculated to standard temperature and pressure.

A release valve and/or limit switch means is provided to protect both the equipment and operators from damage or injury due to malfunctions, the release valve being adapted to open when the pressure within the container builds to a predetermined level and the limit switch being adapted to shut down the apparatus when the piston moves beyond a predetermined limit position.

An arrangement for collecting the mercury employed in the sliding liquid seal is designed to prevent intermixing of the gas and the mercury.

42 Claims, 9 Drawing Figures

APPARATUS FOR CALIBRATING FLOW METERS AND THE LIKE

BACKGROUND OF THE INVENTION

The present invention relates to apparatus for testing and calibration of flow meters and the like and more particularly to apparatus for measuring flow rate and employing novel tape driven precision encoder means for providing highly accurate flow rate measurements.

Flow meters are utilized in a wide variety of applications which require constant monitoring of the flow rate of a material, such as, liquids and gases. Many flow meters are used in critical applications wherein it is important to both monitor and regulate extremely small flow rates, especially those employed in life sustaining medical applications. It is thus important to test and calibrate flow meters through instrumentation which must necessarily be itself highly accurate in order to accurately test and calibrate the flow meter.

Apparatus which has been designed for flow meter testing and calibration is described in U.S. Pat. No. 3,125,879 issued Mar. 24, 1964 and is comprised of a piston member slidably mounted within a hollow container which receives the flow passing the flow meter under test, said flow filling the container and causing the piston to rise. Means are provided for detecting the movement of the piston past a starting point and a termination point whereby a timer is respectively energized and turned off at the aforesaid starting and termination points. The prior knowledge of the volume of the container together with the elapsed time required for the piston to move between the two aforesaid points yields a flow rate. Suitable sealing means for providing a gastight sliding seal between the piston and the container is taught by U.S. Pat. No. 2,927,829 issued Mar. 8, 1960 and comprised of a liquid mercury seal arranged within an annular groove provided in the piston and making wiping contact with the interior of the container.

The apparatus taught in the aforesaid U.S. Pat. No. 3,125,879 has a number of drawbacks among which are the complications in the use of the equipment and the inaccuracies in the readings developed by the equipment due to inherent shortcomings in equipment design which requires a significant amount of human intervention during a test, leading to attendant human error.

The sensing devices employed to detect movement of the piston past the starting and termination points comprise combination light source and light sensitive elements which detect the presence of the liquid mercury seal. Any misalignment or skewing of the piston relative to the container introduces an error into the flow rate reading. Also, limitations on the flow rate reading result from the limitations on the lack of flexibility of positioning the sensor devices. In addition, the apparatus of the prior art cannot provide a plurality of flow rate readings at closely spaced intervals between the aforesaid starting and termination points, since the prior art apparatus yields a total elapsed time reading as opposed to a true flow rate reading, nor does it provide flow rate readings which are adjusted to standard temperature and pressure. This is due to the fact that there is no technique available for taking into account unexpected changes in measured temperature and/or pressure which do occur during a test interval.

BRIEF DESCRIPTION OF THE INVENTION

The present invention is characterized by providing a novel method and apparatus for testing and calibration of flow rate and flow meters, said apparatus comprising a piston slidable within a hollow chamber and utilizing liquid mercury as a gas-tight seal between the slidable piston and the container. The light source and light sensing elements employed in the prior art are totally eliminated and replaced by very high precision encoder means driven by a rotatably mounted encoder pulley. One end of a tape is secured to the slidable piston at a location coincident with the central axis of the piston and is entrained about the aforesaid encoder pulley. The opposite end of the tape is affixed to a slidable counterbalancing member for offsetting at least a portion of the weight of the slidable piston thereby enhancing the sensitivity of the system.

The flow rate readings are taken by introducing the gas passing through the flow meter under test into the aforesaid container causing the piston to rise. Initiation of a flow rate calibration by depressing a start button causes a timer to begin timing upon occurrence of the next pulse developed by the encoder means which is designed to generate a pulse representative of each incremental angular advancement in the position of the encoder shaft. The pulses developed by the encoder are accumulated in a counter. The accumulated count is examined at regular closely spaced time intervals under control of the timer to develop a flow rate at each of said intervals. A flow rate operation is terminated by depressing a stop button which turns off the aforesaid timer upon the occurrence of the next pulse developed by the encoder means.

The timer is adapted to generate timing signals, preferably in binary coded form, at predetermined intervals, said timing signals preferably being generated a significant number of times between initial energization and final deenergization of the timing means to generate flow rate calculations at each of said time intervals. The intervals are preferably spaced sufficiently close to provide an accurate representation of the flow rate between the starting and stopping points and sufficiently far apart to allow sufficient time to complete the flow rate calculations (which are preferably performed electronically and on a real time basis). Pressure and temperature sensing devices are utilized to correct the volume reading of the gas as it is collected in the container, to standard pressure and temperature conditions.

Means are provided for halting the operation of the apparatus in the event that the piston member moves beyond the safe operating limits of the equipment. A releasable seal may also be provided to protect against overpressure conditions and thereby prevent such conditions from damaging the apparatus and/or harming the operator.

A collector arrangement is provided for collecting liquid mercury escaping from the sliding seal and preventing the collected mercury from interfering with the gas inlet which introduces gas from the flow meter under test into the piston container.

The valve system forming part of the aforesaid apparatus selectively provides flow to the proper sources and further purges the container of gas upon the completion of a calibration test.

OBJECTS OF THE INVENTION AND BRIEF DESCRIPTION OF THE FIGURES

It is therefore one object of the present invention to provide an apparatus for measuring a flow rate and incorporating precision encoder means driven by tape means affixed to a slidably mounted piston for generating signals representative of container volume to facilitate the development of flow rate readings.

Still another object of the present invention is to provide a piston driven precision encoder for use in flow rate measurements and the like wherein piston movement responsive to the flow of gas through a flow meter being calibrated is imparted to the precision encoder by tape means, said apparatus including means for counterbalancing at least a portion of the weight of the aforesaid piston to increase the operating range of the flow rate measuring apparatus.

Still another object of the present invention is to provide novel apparatus for producing flow rate readings comprising precision encoder means and timing means for generating timing signals at a predetermined rate to enable the calculation of flow rate readings at uniform closely spaced time or volume intervals.

The above as well as other objects of the present invention will become apparent while reading the accompanying description and drawing in which.

DETAILED DESCRIPTION OF THE INVENTION

Figure 1:
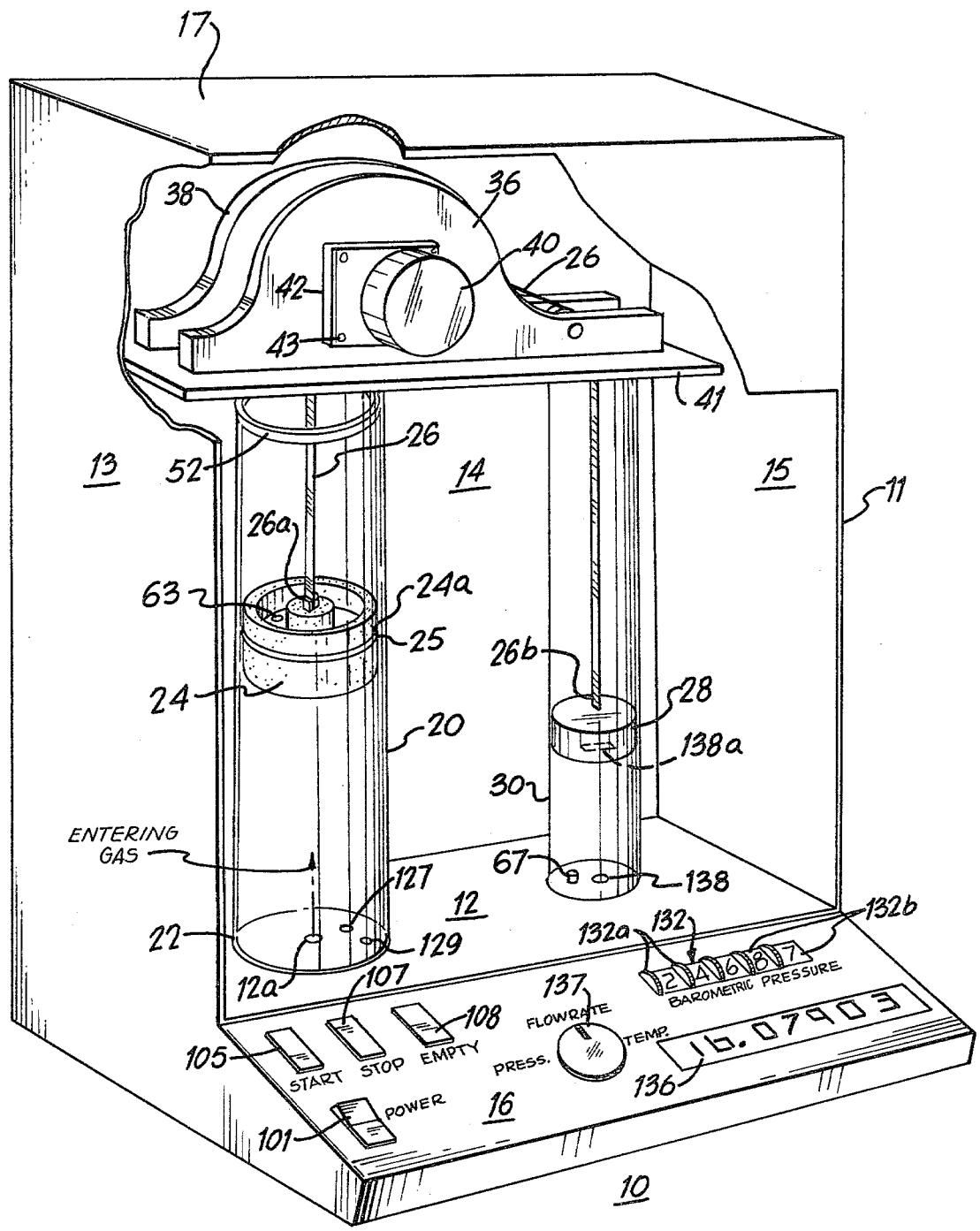
FIG. 1 is a perspective view of flow rate testing apparatus designed in accordance with the principals of the present invention.

FIG. 1 shows a flow rate measurement apparatus 10 embodying the principles of the present invention and comprised of a housing 11 having a supporting surface 12 enclosed on three sides by upright walls 13, 14 and 15 and top 17. A front panel 16 contains control knobs and buttons as well as display panels to be more fully described for controlling the measurement operation and for displaying the measurements developed by the apparatus 10.

The supporting surface 12 has a gas inlet opening 12a coupled through a conduit means to be more fully described for the purpose of introducing the gas flow whose flow rate is to be measured. A hollow transparent cylindrical container 20 is positioned upon the platform 12. A gas-tight seal 22 is provided between the surface of platform 12 and the lower edge of container 20 to prevent gas from escaping between container 20 and platform 12.

A cylindrical-shaped piston 24 is slidably mounted within container 20. The piston 24 has an outer diameter which is just slightly less than the inner diameter of container 20. The piston 24 is provided with an annular groove 24a for receiving a liquid, preferably mercury. The clearance between the outer diameter of piston 24 and the inner diameter of container 20 and the manner and amount of liquid mercury provided within groove 24a to provide a suitable gas-tight liquid seal 25 may be selected in accordance with the teachings of U.S. Pat. No. 2,927,829 issued Mar. 8, 1960 and referred to above. The manner in which the mercury is introduced into groove 24a may also be introduced in accordance with the teachings of the aforementioned U.S. Pat. No. 2,927,829, although other satisfactory techniques may be employed, if desired.

The sliding liquid seal 25 allows the piston 24 to experience extremely minimal frictional forces in moving either up or down within container 20 while at the same time providing an excellent gas-tight seal between piston 24 and container 20.

The interior surface of piston cylinder 20 is preferably coated to prevent development of static electricity and to provide a good non-wetting surface for the liquid (mercury) seal. The coating may be tetrafluoroethylene applied so as not to affect the transparency of the cylinder 20.

Piston cylinder 20 has an open upper end (not shown) exposing the upper surface of piston 24 to atmospheric pressure. An elongated tape 26 has a first end 26a secured to piston 24 preferably at a position coincident with the central axis of piston 24. The opposite end 26b of tape 26 is secured to a counterweight 28 arranged within a second cylinder 30. The counterweight 28 has a cylindrical shape similar to that of piston 24 but of smaller diameter. The tape 26 is secured to counterweight 28 preferably at a position which is coincident with the central axis of counterweight 28.

Tape 26 is formed of a material which is capable of freely flexing without experiencing any noticeable stretching. The tape 26 may be formed of plastic, fiber or fabric reinforced plastic or relatively thin gauge metal such as, for example, steel, brass or copper. The tape 26 extends over first and second pulleys 32 and 34 shown best in FIGS. 1a and 1b. As will be more fully described in detail, the tape 26 is designed to impart rotation to pulleys 32 and 34 as a result of the movement of piston 24 due to the introduction or exiting of gas from piston cylinder 20.

Figure 1A:
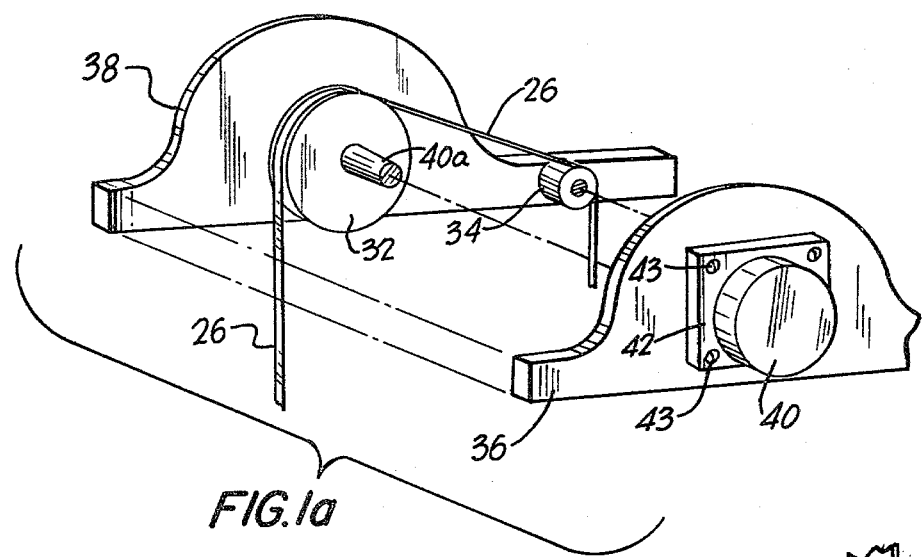
FIG. 1a shows a detailed perspective view of the pulley arrangement which imparts drive to the precision encoder from the tape member moved by the slidable piston, which elements are shown in simplified fashion in FIG. 1.
Figure 1B:
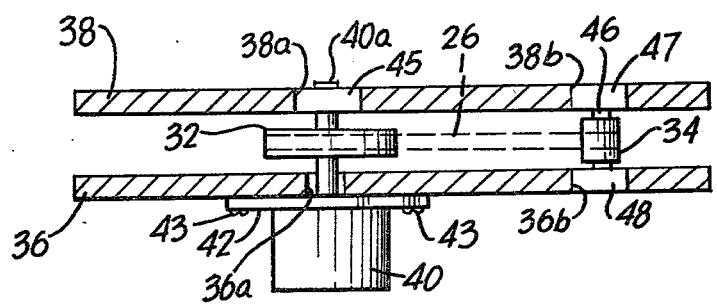
FIG. 1b shows a diagrammatic, partially sectionalized, plan view of the mounting assembly for the pulley and precision encoder of FIG. 1.

Noting especially FIGS. 1, 1a and 1b, the aforementioned pulleys 32 and 34 are supported by a pair of spaced parallel plates 36 and 38 which may be arranged upon a support plate 41 having slots (not shown) to allow the free movement of the vertically aligned portions of tape 26. Alternatively, the plates 36 and 38 may be supported either directly upon the upper edges of cylinders 20 and 30 or by other support members (not shown) which may in turn be supported by sidewalls 13–15.

The plates 36 and 38 are adapted to support the aforementioned pulleys 32 and 34 and a high precision shaft angle encoder 40. Shaft angle encoder 40 includes a freewheeling rotatable shaft 40a extending from one end of the encoder 40. A bracket 42 is secured to the same end of encoder 40 and is provided with apertures (not shown) for receiving threaded fastening members 43 which threadedly engage aligned tapped apertures (not shown) in plate 36. The opening 36a in plate 36 provides a clearance gap between the inner diameter of opening 36a and the outer diameter of shaft 40a. Shaft 40a extends through an opening 38a in plate 38 which receives and supports bearing member 45 which supports and freewheelingly mounts the free end of shaft 40a. Pulley 32 is secured to shaft 40a and makes rolling engagement with tape 26 shown in dotted fashion in FIG. 1b.

Pulley 34 is secured to a shaft 46 whose opposite ends are freewheelingly mounted within bearings 47 and 48 arranged within openings 38b and 36b, respectively to freewheelingly mount shaft 46 and hence pulley 34. Tape 26 extends over pulley 34, as well as pulley 32.

As will be described in greater detail hereinbelow, the function of encoder 40 is to develop a pulse representative of each incremental change in shaft angle position of pulley 32, which change in shaft angle position represents linear movement of piston 24. As a result, it is important to minimize and ideally eliminate slippage between tape 26 and pulley 32. This feature is not necessary with respect to pulley 34. In order to further enhance the frictional engagement between pulley 32, the periphery of pulley 32 may be coated or otherwise treated to provide a surface making good frictional engagement with tape 26. Tape 26 may also be coated or treated to enhance the aforesaid frictional engagement either alone or in conjunction with the treatment of pulley 32.

Figure 1C:
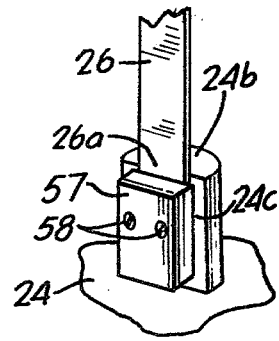
FIG. 1c is a detailed perspective view showing the manner in which the tape member is mounted to the slidable piston.

FIG. 1c shows the manner in which end 26a of tape 26 is mounted to piston 24. The upper surface of piston 24 is provided with a narrow projection 24b which comprises a half cylinder having a flat vertical surface 24c which is aligned so that the central axis of piston 24 lies in the plane of surface 24c. A plate 57 is provided with a pair of openings for receiving threaded fastening members 58 which pass through the openings in plate 57 and openings (not shown) in tape 26 so as to threadedly engage tapped apertures in projection 24b in order to secure both plate 57 and the lower end 26a of tape 26 to projection 24b and yet simplify removal and replacement of the tape 26.

Figure 1D:
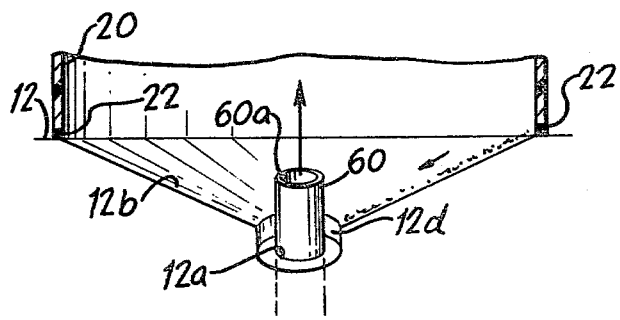
FIG. 1d is a detailed perspective view showing the manner in which liquid mercury which has become separated from the sliding seal is collected at the base of the piston container.

FIG. 1d shows an alternative arrangement for the portion of platform 12 which forms the base of piston cylinder 20. As shown, sealing means 22 supports and gas-tightly seals the lower end of piston cylinder 20 to platform 12. The portion 12b of platform 12 which is encircled by piston cylinder 20 is inclined downwardly from the outer periphery toward the center thereof to form a convex conical-shaped surface 12b. The conical-shaped surface 12b terminates in a short cylindrical recess 12d which surrounds central opening 12a. A hollow tube 60 extends upwardly through opening 12a. The upper end 60a of tube 60 is positioned well above the cylindrical-shaped recess 12d. Tube 60 serves as the means for introducing the gas passing through the flow meter under test into piston cylinder 20. Mercury which drips or is otherwise released from the liquid seal 25 will drop upon the inclined surface 12b and flow downwardly by gravity into the small recess 12d to facilitate collection of the liquid mercury and yet prevent mixing of the mercury and the gas in tube 60.

Figure 1E:
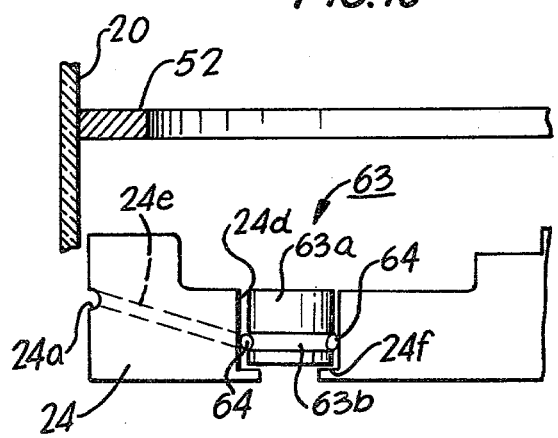
FIG. 1e shows a detailed sectional view of a releasable plug incorporating a mercury seal and forming part of the piston assembly of FIG. 1.

As shown in FIGS. 1 and 1e, piston 24 may be provided with a mercury seal 64 which serves as a pressure release. The piston 24 is provided with a vertically aligned bore 24d extending between the upper and lower surfaces of piston 24 and having a shoulder 24f. A plunger member 63a is arranged within bore 24d and is provided with an annular-shaped groove 63b for receiving liquid mercury forming the liquid seal 64. The plunger member 63a normally rests upon shoulder 24f and is designed to be lifted upwardly when the pressure in the chamber formed by piston cylinder 20 and piston 24 exceeds a predetermined threshold. Alternatively, when piston 24 comes into contact with ring 52 positioned near the top of piston cylinder 20, the piston 24 can no longer be lifted causing the pressure in piston cylinder 20 to build until member 63a is lifted out of bore 24d. The mercury of liquid seal 64 will flow out of the region of the liquid seal 64 and drop upon the aforementioned inclined floor 12b in order to be collected in the reservoir 12d. The annular groove 24a extending around the outer periphery of piston 24 may be arranged to communicate with bore 24d allowing mercury within the annular groove 24a to pass through the internal bore 24e represented in dotted fashion in FIG. 1e and be collected within the aforementioned reservoir 12d at the base of the piston cylinder 20 to facilitate removal of piston 24 from piston cylinder 20 for maintenance, inspection and other purposes. As another alternative, when pressure sensor 127 (FIG. 2) senses a predetermined threshold level, threshold detector 133 is activated to halt the flow rate test.

Considering FIG. 1, the counterweight 28 acts to reduce the weight of piston 24 and thereby reduce the compression of the gas accumulating in piston cylinder 20 by piston 24. The clearance gap between cylinder 30 and counterweight 28 is not critical, since the cylinder 30 serves only to prevent the counterweight 28 from swinging as a result of linear movement of counterweight 28 in the vertical direction during a measurement operation. Cylinder 30 may be replaced by three or more spaced parallel rods if desired. Preferably the weight of counterweight 28 is made equal to or less than the weight of piston 24. Counterweight 28 is preferably smaller in size than piston 24 but may be formed of a material of greater density. For example, piston 24 is preferably formed of a plastic material such as, for example, polyvinylchloride. In one preferred embodiment the weight of the counterweight 28 is preferably made equal to 80% of the weight of piston 24 so that there is always some back pressure working against the flow meter under test. However, the weight of counterweight 28 may be increased to exactly balance the weight of piston 24 in order to allow measurements to be made at atmospheric pressure. When making measurements under conditions of atmospheric pressure, a blower (not shown) positioned beneath platform 12 and having an outlet 67 may be positioned to direct air towards counterweight 28 to lift counterweight 28 as piston 24 is being lowered in order to overcome the otherwise balanced condition between piston 24 and counterweight 28. During the measurement operation, i.e. when piston 24 is being lifted, the fan is deenergized and the bottom of counterweight cylinder 30 is exhausted to the atmosphere to prevent any back pressure from building within counterweight cylinder 30 and beneath counterweight 28 during a measurement operation.

Encoder 40 is a high precision shaft angle encoder. One suitable encoder which may be employed in the system of the present invention is the Model 5V279A shaft position encoder manufactured by Baldwin Corporation and capable of generating 5,000 bit positions per single revolution. The angular travel experienced by the shaft 40a of shaft angle encoder 40 for a given vertical distance of travel in cylinder 20 is a function of the diameter of pulley 32. Obviously, the diameter of pulley 32 may be increased or decreased to vary the resolution of flow rate measurements. Also, the sizes of piston 24 and piston cylinder 20 may be selected to accommodate the range of flow rates to be measured. If desired, a plurality of different size pistons and piston cylinders, as well as counterweights, may be provided on platform 12 to accommodate a wide range of flow rate measurements. Thus, each pulse generated by the encoder represents a predetermined unit of volume, said unit being dependent upon the above-mentioned design parameters.

Pulley 32 and encoder shaft 40a are designed to have high concentricity since any eccentricity will have a lifting and/or lowering effect upon tape 26 and thereby introduce an error into the readings. Although tape 26 may experience expansion or contraction depending upon the ambient temperature, the amount of expansion or contraction experienced by tape 26 is effectively nil over the time interval of a test run which is typically of the order of 20 seconds.

Figure 3:
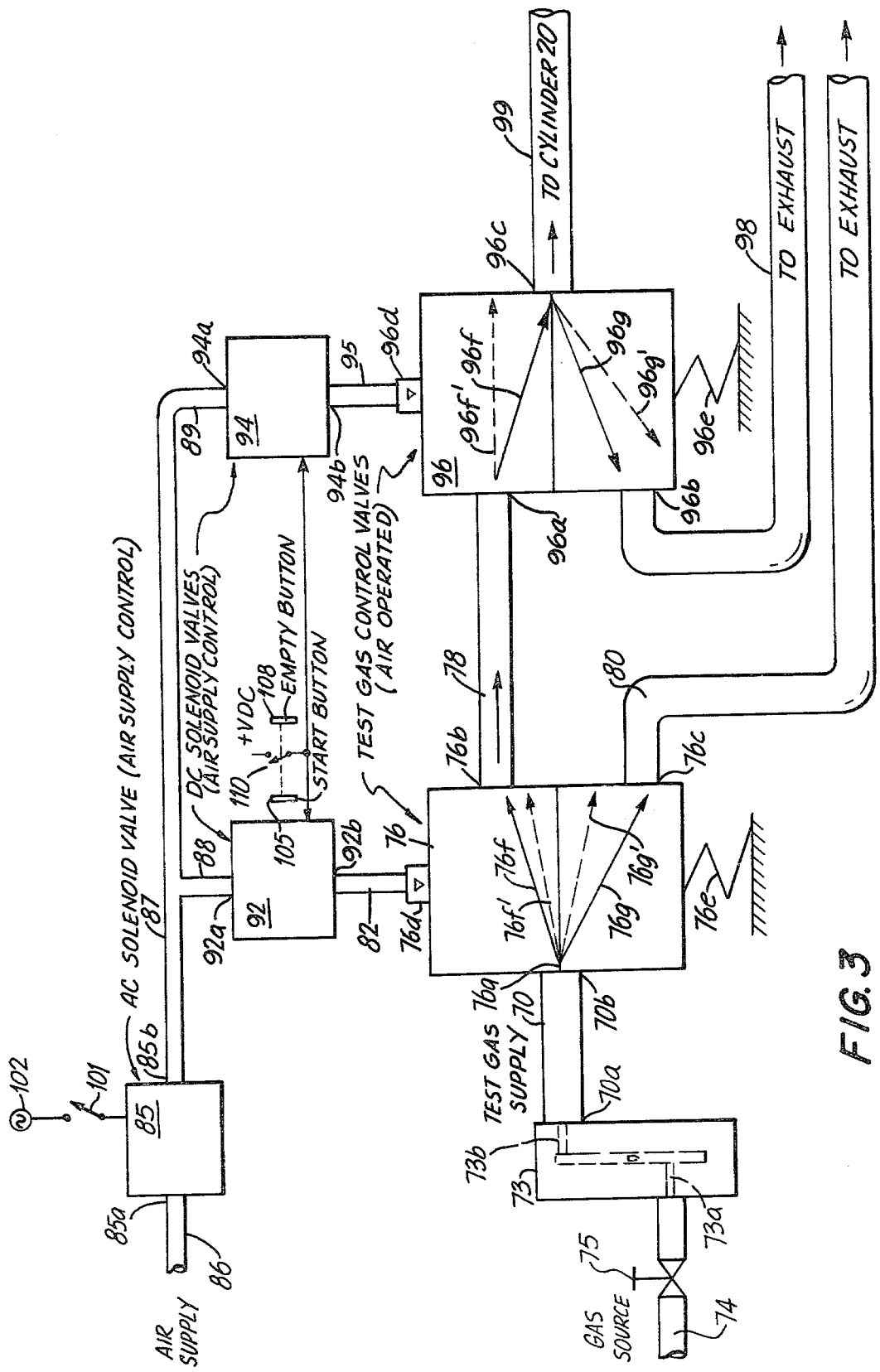
FIG. 3 is a simplified diagrammatic view showing the valve arrangement employed to operate the flow rate measurement apparatus of FIG. 1.

FIG. 3 shows a block diagram of the valving employed to operate the flow rate apparatus of FIG. 1. A test gas supply conduit 70 is provided with an inlet end 70a for connection with the outlet end 73b of a flow meter 73 which receives the test gas from a controlled source (not shown) and which source is coupled to the inlet end 73a of flow meter 73 by means of a conduit 74 having a manually adjustable valve 75 for adjusting the flow rate between the test gas source and the flow meter 73. The downstream end 70b of test gas supply conduit 70 is coupled to the inlet 76a of an air operated control valve 76. Control valve 76 is provided with ports 76b and 76c coupled to conduits 78 and 80 and a control inlet 76d coupled to a conduit 82. Control valve 76 may be of the conventional type spool valve manufactured by Norgren Company. The disclosure herein has thus been simplified for purposes of brevity.

A source of air under pressure (not shown) is coupled to the inlet end 85a of an AC solenoid valve 85 through air supply conduit 86. The outlet 85b of solenoid valve 85 is coupled through common conduit 87 and branch conduits 88 and 89 to the inlet openings 92a and 94a of DC solenoid valves 92 and 94. Outlet 92b of DC solenoid valve 92 is coupled to the air pressure control inlet 76d of test gas control valve 76 through conduit 82.

The control valve 96 may be generally of the same type as valve 76 and has a pair of ports 96a and 96b adapted to be selectively coupled with a port 96c on a mutually exclusive basis, as will be more fully described. Air pressure control inlet 96d is coupled to outlet 94b of DC solenoid valve 94 by means of conduit 95.

Test gas control valve 76 is provided with a biasing spring 76e for biasing control members shown diagrammatically in the Figure as arrows 76f and 76g, respectively. When no air pressure is introduced into the air pressure control inlet 76d, biasing spring 76e biases members 76f and 76g so that member 76f occupies the dotted line position 76f' to block the flow path between port 76a and port 76b. Simultaneously therewith, member 76g is biased to the solid line position to establish a flow path between port 76a and port 76c enabling any test gas introduced into the valve 76 from supply conduit 70 to pass through port 76c and conduit 80 so as to be exhausted into the atmosphere.

Test gas control valve 96 has a similar biasing spring 96e whereby when no air under pressure is introduced into air pressure control inlet 96d, biasing spring 96e biases member 96f to the dotted line position 96f' to block the path between port 96a and port 96c. Simultaneously therewith, member 96g is biased to occupy the solid line position 96g' coupling port 96c to port 96b enabling any test gas accumulated within piston cylinder 20 to pass through port 96c valve 96, port 96b and conduit 98 so as to be exhausted into the atmosphere.

When air under pressure is introduced into the air pressure control inlet 96d, member 96f occupies the solid line position 96f' and member 96g occupies the dotted line position 96g' thereby establishing a path between port 96a and port 96c while at the same time blocking a path between port 96c and port 96b so that any test gas introduced into port 96a through conduit 78, which test gas is derived from the test gas supply conduit 70 and valve means 76, is introduced into the piston cylinder 20 through conduit 99.

Considering FIG. 1 in conjunction with FIG. 3, control panel 16 is provided with an on/off power switch 101. When power is turned on, solenoid 85 is energized by AC power source 102 to open its valve and provide pressurized air delivered from a supply source through conduit 86 to the inlets 92a and 94a of DC solenoid valves 92 and 94. When start button 105 on control panel 16 is depressed, closing the switch 110 shown in FIG. 3, the solenoids (not shown) of solenoid valves 92 and 94 are simultaneously energized to pass air from air supply source 86 through open valve 85 and open valves 92 and 94 to the air pressure control inlets 76d and 96d of test gas control valves, 76 and 96, respectively. As a result, test gas introduced into the gas control valve 76 by way of test gas supply conduit 70 is delivered to supply conduit 78 while conduit 80 is sealed. The test gas in conduit 78 is supplied to conduit 99 for introduction into the opening 12a in the base of piston cylinder 20 while exhaust conduit 98 is sealed. This results due to the pressurized air introduced into the air pressure control inlets 76d and 96d which operate against their associated biasing spring 76e and 96e, respectively.

Piston 20 begins to rise at a rate determined by the flow rate of gas introduced into piston cylinder 20. Upon the occurrence of the first pulse generated by the precision encoder 40, a flow rate measurement operation is initiated which functions in a manner to be more fully described.

By depressing "EMPTY" push button 108, electrical switch 110 is open causing solenoid valves 92 and 94 to cut off air pressure from the air control inlets 76d and 96d whereby the control valves 76 and 96 are reset under control of their biasing members 76e and 96e causing gas introduced into the test supply conduit 70 to pass into the exhaust conduit 80 to be exhausted to the atmosphere and causing conduit 99 to be coupled to exhaust conduit 98 allowing gas accumulated within piston cylinder 20 to be exhausted to the atmosphere.

Figure 2:
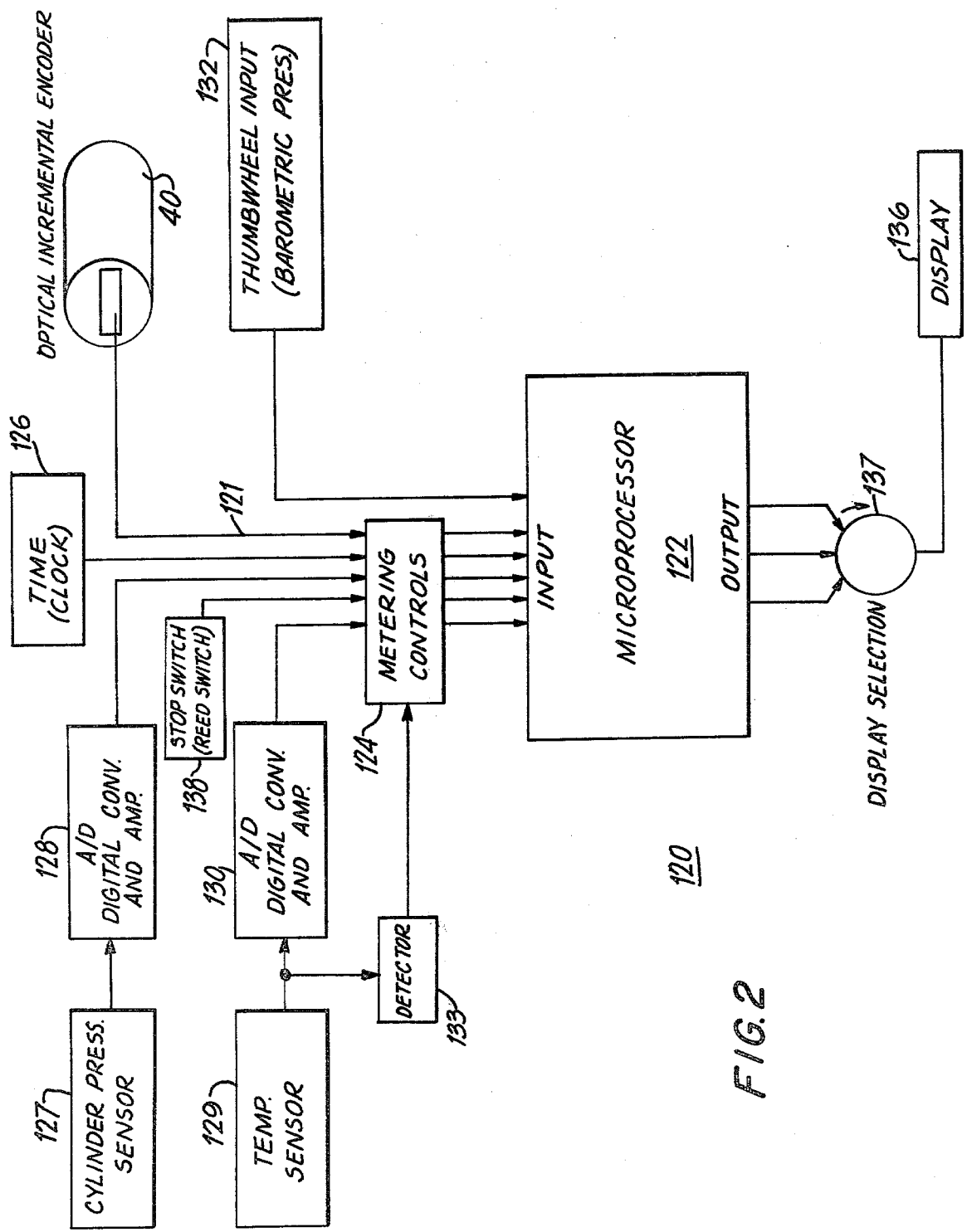
FIG. 2 is a block diagram of the system electronics employed in conjunction with the flow rate measurement apparatus of FIG. 1.

FIG. 2 shows the electronics employed for the purpose of performing the flow rate calculations. The system electronics 120 employs a microprocessor 122. Precision encoder 40 develops output pulses which are coupled through line 121 to the metering control circuit 124. A clock source 126 is provided to generate timing pulses representative of elapsed time and is coupled to microprocessor 122 through the metering controls 124. A cylinder pressure sensor 127 which is preferably mounted on the base of the piston cylinder as shown in FIG. 1, generates a pressure signal which is converted by analog-to-digital converter 128 for application of the pressure signal in digital form to metering control 124 and ultimately to microprocessor 122.

Stop switch 138 which may, for example, be a reed switch arranged at the base of the cylinder 30 housing counterweight 28 as shown in FIG. 1, is adapted to provide an overriding stop signal for deenergizing the device 10 and exhausting the piston cylinder 20 in the event that the counterweight 28 reaches a position close to the bottom of the counterweight cylinder 30. The counterweight 28 is preferably provided with a permanent magnet member 138a which, when it moves in close proximity to reed switch 138, causes a switch closure operation of reed switch 138 which provides an overriding stop signal to the control apparatus 120 of FIG. 2. The threshold detector 133 may be used in lieu of or in addition to stop switch 138 to halt a flow rate test.

In order to monitor temperature within the piston cylinder 20, a temperature sensor 129 is positioned in the base of piston cylinder 20 and is adapted to provide a reading of the temperature within the piston cylinder during a flow rate measurement operation. The output of temperature sensor 129 is converted into digital form by analog-to-digital converter 130, whose output is coupled to microprocessor 122 through metering controls 124.

Microprocessor 122 is provided with a program for computing the flow rate as will be more fully described. The outputs developed by microprocessor 122 include, but are not limited to, the elapsed time, volume, the calculated flow rate and the cylinder test gas temperature and pressure. Adjustment of the selector switch 137 couples one of these outputs to display panel 136 for display of the desired information.

Figure 4:
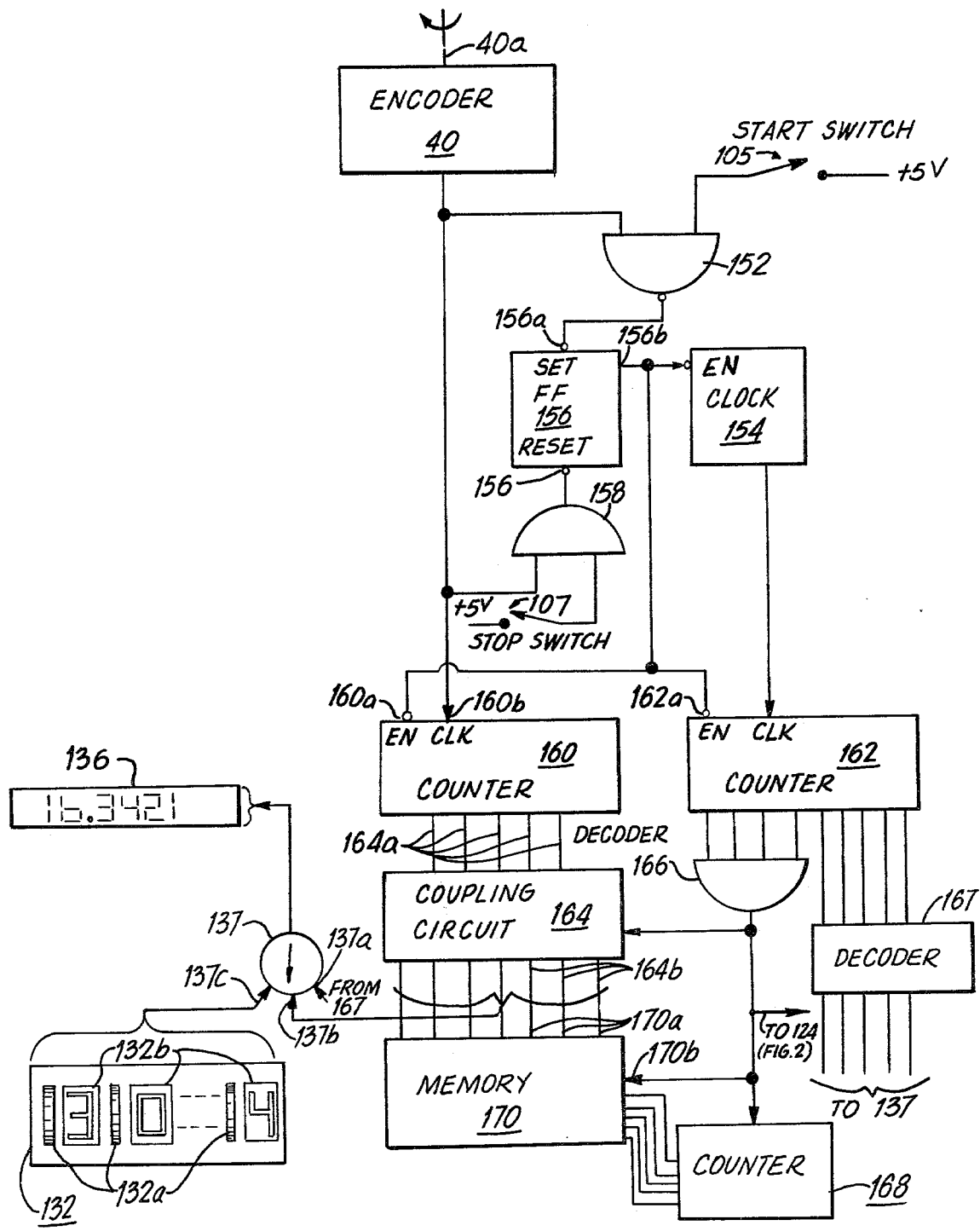
FIG. 4 is a simplified block diagram useful in explaining the manner in which flow rate calculations are obtained.

The operation of the flow rate apparatus, set forth in greater detail, is as follows:

Power switch 101 is turned on to provide power to all of the system valving shown in FIG. 3 and the system electronics 120 shown in FIG. 2. A flow meter 73 to be tested and/or calibrated is coupled between the gas source conduit 74 and the test gas supply conduit 70. The flow rate from the gas source is regulated by setting adjustable valve 75. With the desired initial conditions having been set, the test is begun by depressing start switch 105. Considering the simplified block diagram of FIG. 4, in conjunction with FIGS. 1, 2 and 3, the closure of start switch 105 couples an enabling signal to gate 152. As was previously described, the start switch 105 also causes air under pressure to be applied to the control inputs 76d and 96d of control valve 76 and 96 shown in FIG. 3 establishing a path from the gas source through conduit 74 to valve 75, flow meter 73, test gas suply conduit 70, control valve 76, conduit 78, control valve 96 and conduit 99 into the piston cylinder 20.

The piston 24 is caused to rise at a rate determined by the flow rate of the gas introduced into the chamber formed by piston cylinder 20 and piston 24 and the size of cylinder 20 and piston 24. The lifting of piston 24 allows the counterweight 28 to lower. Tape 26 which is affixed between piston 24 and counterweight 28 experiences linear movement and, due to its frictional engagement with pulley 32, causes pulley 32 to rotate.

Encoder shaft 40a rotates with the rotation of pulley 32 and develops an output pulse when the encoder shaft 40a moves through the smallest measurable increment of angular rotation. This pulse is applied to the clock pulse input 160b of counter 160 and to the remaining input of gate 152 causing the output of gate 152 to go low. This condition is applied to the Set input 156a of bistable flip-flop 156 causing output 156b to go low. Output 156b is applied to the enabling inputs 160a of counter 160 and 162a of counter 162. The setting of bistable flip-flop 156 also applies an enabling signal to clock 154 through output 156b causing clock 154 to generate pulses at a predetermined rate, for example, every 0.01 seconds.

The output of encoder 40 is also applied to the clock input of counter 160 which receives an enable signal from the output 156b of bistable flip-flop 156 which enables pulses from encoder 40 to be counted by counter 160. The level at the output 156b of bistable flip-flop 156 is also applied to the enable input 162a of counter 162 enabling clock pulses from the clock 154 to be counted. A decoder circuit 166 which is selectively coupled to stages of counter 162, detects the passage of a predetermined amount of elapsed time, for example, one second, to apply a pulse to coupling circuit 164 to an enabling input of memory 170 and to the counting input of counter 168. The application of an enabling pulse to coupling circuit 164 enables the binary count applied to its inputs 164a from counter 160 to appear at its outputs 164b for application into the load inputs 170a of memory 170. The pulses occurring every second and developed at the output of decoder 166 are also applied to counter 168 which develops a binary count representative of the number of seconds which have elapsed since timing pulses have been accumulated. The binary output developed by counter 168 is utilized as an address for controlling the location in memory 170 in which the accumulated count of encoder pulses is to be stored. The output of decoder 166 is also utilized as a write-enable pulse applied to the write-enable input 170b of memory 170. Thus, the accumulated count of encoder pulses developed in counter 160 at each one second interval is transferred to memory 170 and is stored in a particular location in memory 170.

The output of decoder 166 is also coupled to metering control logic 124 to cause the temperature and pressure values of sensors 129 and 127 converted to digital form by converters 128 and 130 to be read into microprocessor 122 to convert the flow rate calculation to standard temperature and pressure, either on a real time basis or on an off-line basis.

The output of counter 162 is also coupled to a decoder 167 for converting the binary count of counter 162 into a binary coded decimal form for application to the switch position 137a of selector switch 137 in order to display elapsed time in display 136 when the selector switch 137 is moved to the switch position 137a.

The coupling circuit 164 is preferably designed to retain its output terminals 164b in the state representing the count last presented to its inputs 164a when the last timing pulse was received from decoder 166. The output 164b may thus be connected to a selective position 137b of selector switch 137 to enable selection of the count of encoder pulses from counter 160 for display by display means 136.

By setting the thumbwheels 132a of barometric pressure input/display device 132 it is possible to introduce the ambient barometric pressure reading which is also capable of being displayed in windows 132b by moving thumbwheels 132a. The barometric pressure may also be displayed in display 136 by moving selector switch 137 to switch position 137c in order to display the barometric pressure reading on display 136. Display 136 is preferably a seven (7) segment LED type display capable of displaying a multi-digit number representative, in the present example, of barometric pressure, accumulated encoder pulses or elapsed time.

The flow rate test typically is performed over a period which may lie in the range of from as few as several seconds to as long as 5 minutes and the time intervals developed by decoder 166 may be one second intervals, one-half second intervals, one-quarter second intervals or any other intervals of greater or smaller length, depending upon the particular flow rates being measured and depending upon the frequency of readings which may be required. Assuming that a sufficient number of readings have been taken, the stop switch 107 is depressed applying an enabling pulse to gate 158. The next pulse developed by encoder 40 after closing stop switch 107 enables gate 158 to apply a reset signal to the Reset input 156c of bistable flip-flop 156, removing the enable pulse from clock 154 and removing the enable signal level from clock 154 as well as the enable inputs 160a and 162a of counters 160 and 162, thereby terminating the test. The values stored in memory 170 thus constitute the accumulated counts of encoder pulses at a plurality of one second intervals. The memory location of each such accumulated count is utilized to represent the elapsed time interval thereby reducing the storage capacity requirement for memory 170.

The flow rate calculations are then completed quite simply wherein each count is divided by the quantity of elapsed time to yield a flow rate value. Further influences upon flow rate such as cylinder pressure and cylinder temperature, measured by the pressure sensor 127 and temperature sensor 129 provided in the piston cylinder as well as ambient barometric pressure, may also be utilized in the flow rate calculations to correct the flow rate to standard temperature and pressure. If desired, the selector switch 137 may be modified to allow the display of cylinder pressure and temperature. Presuming the system has been designed so that each encoder pulse represents an increase (or decrease) in volume of one cubic centimeter, the count developed may be directly read in units of volume without conversion. Obviously, if another physical arrangement is utilized, the accumulated encoder pulses may be converted by an appropriate constant into a quantity representing units of volume.

The calculations may be performed in an off-line basis either manually or by off-line computer means or alternatively the calculations may be performed during real time through the use of the system 120 of FIG. 2 and incorporating microprocessor 122, said microprocessor 122 being appropriately programmed to accept encoder pulses and signals representing elapsed time, cylinder pressure and temperature values and the ambient barometric pressure in order to calculate the flow rate corrected to standard pressure and temperature conditions, which may be displayed automatically and/or by appropriate positioning of selector switch 137 for presentation by display 136.

The real time calculation is obtained as follows:
The equation for corrected flow rate is:

$$\frac{V_{std}}{t} = \frac{T_{std} \times P_{meas} \times V_{meas}}{T_{meas} \times P_{std} \times t}$$

where
 $V_{std}$ = standard volume
 t = elapsed time
 $T_{std}$ = standard temperature in °K.
 $V_{meas}$ = volume measured by encoder 40
 $T_{meas}$ = temperature inside of piston cylinder 20 in °K.
 $P_{std}$ = standard pressure
and where $$P_{meas} = P_{bar} + P_{t.g.}$$

where
 $P_{t.g.}$ = test gas gauge pressure (in piston cylinder 20)
 and
 $P_{bar}$ = barometric pressure At predetermined intervals of time, each of a length sufficient to allow the microprocessor 122 to complete a calculation (for example 0.5 seconds), decoder 166 (see FIG. 4) enables microprocessor 122 to make a calculation. The signals representing the barometric pressure, test gas pressure, ambient temperature, accumulated unit volume signals (since the last calculation) are loaded into microprocessor 122 from units 132, 129, 128, 160. The calculation is performed to develop signals representing the flow rate adjusted to standard temperature and pressure. These signals are coupled to the display 136 through selector swith 137 to display the corrected flow rate. Display 136 continues to display the last flow rate calculated until the next flow rate is calculated. This technique assures that piston cylinder temperature and pressure which are measured on a continuous basis, are sampled at closely spaced time intervals to be assured that any changes in piston cylinder temperature and pressure are substantially immediately taken into account in the flow rate calculations. This is true regardless of whether flow rate calculations are made on a real time basis or by an off-line computational technique, simply by storing the values of piston cylinder temperature and pressure at the time that the volume and time readings are taken.

Ideally, measurements taken at one second intervals should be identical. As a practical matter, the flow rate values generated by the microprocessor 122 differ from the ideal value in a plus or minus range about the ideal value and the multiplicity of flow rates calculated enable the ideal value to be determined. Although the invention is preferably designed for use in measuring non-hazardous gases, it is possible to test and/or calibrate flow meters normally designed for use with hazardous gases by introducing a non-hazardous gas and converting the calculations into a flow rate for the hazardous gas based upon the flow rate relationships between the non-hazardous and hazardous gases. The design of the system of the present invention thus enables accurate precision testing and calibration of flow meters which are used in a variety of critical applications among which are dispensing of oxygen to a patient or the control of any gas or liquid flow rate which requires precision regulation.

A latitude of modification, change and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for use in measuring the flow rate of a gas, comprising:
   a container having means for introducing a gas into the interior of said container;
   piston means slidably mounted in said container and being moved by the gas introduced or removed from said container;
   precision encoder means for generating a signal representing each change in a predetermined unit of volume; and
   coupling means responsive to movement of said piston means for activating said encoder means;
   timing means for generating timing pulses defining a short constant time interval between adjacent pulses;
   flow rate generating means responsive to said encoder means and said timing means for generating an output representing the flow rate during each time interval.

2. The apparatus of claim 1 wherein said precision encoder means comprises a shaft angle encoder having an input shaft.

3. The apparatus of claim 2 wherein said coupling means comprises elongated tape means coupled to said piston means and rotatably driving said encoder input shaft.

4. The apparatus of claim 3 further comprising counterbalancing means; and
   said tape means being coupled between said counterbalancing means and said piston means whereby said counterbalancing means at least partially offsets the influence of the weight of said piston means upon the gas accumulated in said container to enhance the accuracy of the measurements.

5. The apparatus of claim 4 further comprising rotatable pulley means having a cylindrical periphery;
   an intermediate portion of said tape means being supported by said pulley means and engaging said cylindrical periphery; and
   said encoder means input shaft being rotated responsive to rotation of said pulley means.

6. The apparatus of claim 5 wherein the signal generated by said encoder means generates at least one pulse during each predetermined incremental rotation of said input shaft; and
   the diameter of said pulley and said container being chosen to cause each of said pulses to represent a change in volume of a predetermined unit volume value.

7. The apparatus of claim 1 further comprising counterbalancing means; and said coupling means being coupled between said counterbalancing means and said piston means whereby said counterbalancing means at least partially offsets the influence of the weight of said piston means upon the contents of said container.

8. The apparatus of claim 7 wherein said counterbalancing means is comprised of a weight; and enclosing means arranged about said weight to limit movement of said weight to slidable reciprocating movement responsive to movement of said first-mentioned piston means.

9. The apparatus of claim 8 wherein said coupling means comprises a tape coupled between said weight and said first-mentioned piston means;
   pulley means;
   said tape being entrained about said pulley means; and
   said precision encoder means input means comprising an input shaft being driven by said pulley means.

10. The apparatus of claim 9 wherein said tape is a metal tape.

11. The apparatus of claim 9 wherein said tape is a flat plastic tape.

12. The apparatus of claim 9 wherein said tape is a flat fiber reinforced plastic tape.

13. The apparatus of claim 1 further comprising sliding seal means for providing a gas-tight sliding seal between the interior of said container and said piston means.

14. The apparatus of claim 13 further comprising coating means provided on the interior of said container for preventing the build-up of static electricity along the interior of said container.

15. The apparatus of claim 1 wherein said piston means being provided with an annular groove facing the interior surface of said container; and
   liquid mercury being provided in said groove and engaging the interior of said container to provide a gas-tight seal between said piston means and said container to prevent the escape of the gas being introduced into said container.

16. The apparatus of claim 1 further comprising:
   manually operable start means; and
   means responsive to the first signal generated by said precision encoder means after operation of said start means for starting said timing means.

17. The apparatus of claim 16 further comprising manually operable stop means; and
   means responsive to operation of said stop means and the next signal generated by said precision encoder means for halting said timing means.

18. The apparatus of claim 1 further comprising:
   display means for generating a visual display representing the output produced by said flow rate generating means; and
   means responsive to said timing means for updating the display generated by said display means during predetermined successive time intervals.

19. The apparatus of claim 1 further comprising sensing means for terminating the flow of gas into said container when said piston means reaches a predetermined threshold level.

20. The apparatus of claim 19 wherein said sensing means comprises reed switch means; and
   magnetic means positioned to activate said reed switch means when said reed switch means approaches said magnetic means.

21. The apparatus of claim 1 further comprising:
   first and second control valves, each having a control input and gas sample input and first and second outputs, whereby said gas sample input is coupled to said first output when said control input receives a first control signal and said gas sample input is coupled to said second output when said control input receives a second control signal;
   the gas sample input of said first control valve being coupled to receive a gas sample;
   the gas sample input of said second control valve being coupled to one output of said first control valve;

one of said outputs of said second control valve being coupled to said container; and exhaust means being coupled to the remaining outputs of said first and second control valves for diverting the gas sample from said container and for exhausting said container.

22. The apparatus of claim 1 further comprising control valve means for introducing a gas sample into said container when in a first operating state and for exhausting said container and diverting gas from the source of the gas sample away from said container when in a second operating state.

23. The apparatus of claim 1 further comprising a source for said gas sample; and a flow meter coupled between said source and said container and being subject to testing for calibration accuracy in accordance with the readings obtained by said apparatus.

24. The apparatus of claim 1 wherein said flow rate generating means comprises computing means for computing the flow rate of gas in said container.

25. The apparatus of claim 24 further comprising first sensing means for generating a signal representing the temperature level in said container; and said computer means including means responsive to said first sensing means for adjusting the flow rate calculated in accordance with the temperature level present in said container to represent a flow rate at standard temperature.

26. The apparatus of claim 24 further comprising pressure signal generating means for providing a signal representing the ambient barometric pressure; and said computer means including means responsive to said pressure signal generating means for adjusting the flow rate calculated to represent the flow rate at standard pressure.

27. The apparatus of claim 24 further comprising means responsive to the temperature and pressure in said container for providing additional signals representing temperature and pressure in said container and the prevailing ambient barometric pressure, said computer means including means responsive to the aforesaid additional signals for adjusting the flow rate calculation in accordance with the magnitudes of the values of said additional signals, to standard temperature and pressure.

28. The apparatus of claim 24 further comprising means responsive to said timing means for enabling said computing means to perform a flow rate calculation at regular predetermined time intervals.

29. The apparatus of claim 28 wherein said last mentioned time intervals are smaller than one second.

30. The apparatus of claim 29 wherein said last mentioned time intervals are in the range from 0.01 to 0.50 seconds.

31. The apparatus of claim 1 wherein said coupling means is responsive to linear movement only along the axis of said piston means for activating said encoder means, thereby enhancing measurement accuracy.

32. The apparatus of claim 1 wherein said timing pulse generating means generates timing signals responsive to operation of said encoder means.

33. The apparatus of claim 1 wherein said flow rate generating means further comprises counter means for accumulating signals from said precision encoder means; and means responsive to said counter means and said timing signals for generating an output representing a flow rate during each time interval.

34. The apparatus of claim 1 wherein said precision encoder means includes means for generating several thousand pulses per revolution.

35. Apparatus for use in measuring the flow rate of a gas, comprising:

a container having means for introducing a gas into the interior of said container;

piston means slidably mounted in said container and being moved by the gas introduced or removed from said container;

encoder means for generating a signal representing each change in a predetermined unit of volume;

coupling means responsive to movement of said piston means for activating said encoder means;

sliding seal means for providing a gas-tight sliding seal between the interior of said container and said piston means;

said sliding seal means comprising a liquid mercury seal;

said container having a floor; and said floor sloping downwardly and inwardly from the interior wall toward a central location of said floor to collect any liquid mercury dripping from the region of said sliding seal at said central location.

36. Apparatus for use in measuring the flow rate of a gas, comprising:

a container having means for introducing a gas into the interior of said container;

piston means slidably mounted in said container and being moved by the gas introduced or removed from said container;

encoder means for generating a signal representing each change in a predetermined unit of volume;

coupling means responsive to movement of said piston means for activating said encoder means;

said piston means being provided with an annular groove facing the interior surface of said container; and liquid mercury being provided in said groove and engaging the interior of said container to provide a gas-tight seal between said piston means and said container to prevent the escape of the gas being introduced into said container;

a centrally located inlet opening being provided in the floor of said container; and a tube extending upwardly from said inlet opening and having an upper end arranged a spaced distance above the level of the floor surrounding said centrally located opening to prevent liquid mercury collected on said floor from entering into said tube and said inlet opening.

37. The apparatus of claim 36 further comprising a recess surrounding said tube for collecting any mercury flowing along said floor and toward said tube.

38. Apparatus for use in measuring the flow rate of a gas, comprising:

a container having means for introducing a gas into the interior of said container;

piston means slidably mounted in said container and being moved by the gas introduced or removed from said container;

encoder means for generating a signal representing each change in a predetermined unit of volume;

coupling means responsive to movement of said piston means for activating said encoder means;

said piston means further including release valve means for releasing the gas within said container to the atmosphere when the pressure in said container reaches a predetermined magnitude.

39. The apparatus of claim 38 further including a stop member inside said container; and said release valve means arranged in said piston means releasing gas collected in said container to the atmosphere when said piston engages said stop member.

40. The apparatus of claim 39 wherein said release valve means comprises a cylindrical-shaped member having an annular groove;

said piston means having an opening for receiving said cylindrical-shaped member; and liquid sealing means arranged in said groove for providing a gas-tight seal between said cylindrical-shaped member and said piston means.

41. The apparatus of claim 38 further comprising counterbalancing means for counterbalancing at least a portion of the weight of said piston means; and limit switch means being positioned to sense the location of said counterbalancing means for terminating the flow of gas into said container.

42. The apparatus of claim 38 further comprising pressure sensing means for generating a stop signal when the pressure in said container exceeds a predetermined value.

* * * * *